(12) United States Patent
Pokorny et al.

(10) Patent No.: US 11,225,021 B2
(45) Date of Patent: Jan. 18, 2022

(54) STEREOLITHOGRAPHY APPARATUS MATERIAL PROVISION DEVICE

(71) Applicant: Ivoclar Vivadent AG, Schaan (LI)

(72) Inventors: Walter Pokorny, Bludesch (AT); Jörg Ebert, Buchs (CH); Johannes Lorünser, Bludenz (AT)

(73) Assignee: Ivoclar Vivadent AG, Schaan (LI)

( * ) Notice: Subject to any disclaimer, the term of this patent is extended or adjusted under 35 U.S.C. 154(b) by 124 days.

(21) Appl. No.: 16/354,636

(22) Filed: Mar. 15, 2019

(65) Prior Publication Data
US 2019/0283323 A1 Sep. 19, 2019

(30) Foreign Application Priority Data

Mar. 16, 2018 (EP) .................... 18162320

(51) Int. Cl.
*B29C 64/255* (2017.01)
*B29C 64/321* (2017.01)
*B33Y 30/00* (2015.01)
*B29C 64/124* (2017.01)
*B33Y 10/00* (2015.01)

(52) U.S. Cl.
CPC .......... *B29C 64/255* (2017.08); *B29C 64/124* (2017.08); *B29C 64/321* (2017.08); *B33Y 10/00* (2014.12); *B33Y 30/00* (2014.12)

(58) Field of Classification Search
CPC ... B29C 64/124; B29C 64/321; B29C 64/255; B29C 64/259; B29C 64/307; B33Y 30/00; B33Y 10/00
See application file for complete search history.

(56) References Cited

U.S. PATENT DOCUMENTS

| | | | |
|---|---|---|---|
| 8,105,066 B2 | 1/2012 | Sperry et al. | |
| 8,221,671 B2 | 7/2012 | Hull et al. | |
| 8,372,330 B2 * | 2/2013 | El-Siblani | B33Y 10/00 264/401 |
| 8,465,689 B2 * | 6/2013 | Sperry | B33Y 40/00 264/401 |
| 8,623,264 B2 * | 1/2014 | Rohner | B29C 64/124 264/401 |
| 8,741,203 B2 | 6/2014 | Liska et al. | |
| 10,406,755 B2 * | 9/2019 | Costabeber | B29C 64/135 |

(Continued)

FOREIGN PATENT DOCUMENTS

CA 3036139 A1 6/2018

*Primary Examiner* — Seyed Masoud Malekzadeh
(74) *Attorney, Agent, or Firm* — Ann M. Knab; Thad McMurray

(57) ABSTRACT

In a stereolithography apparatus a material provision device for print material (16) to be cured, in particular a photopolymer, is provided. The material provision device (10) receives a material cartridge (12) which in turn receives the print material (16) and surrounds it on all sides. The material cartridge (12) may be connected to an outlet valve unit (20) in a liquid-proof manner via which the print material (16) may be output and which is received at least partially in the material provision device (10) and which is supported at least partially thereon or therein or sealed against it. The outlet valve unit (20) comprises a valve (100) which is opened and closed depending on the relative position, in particular the swiveling position, of material provision device (10) and stereolithography apparatus.

17 Claims, 8 Drawing Sheets

(56) References Cited

U.S. PATENT DOCUMENTS

| | | | |
|---|---|---|---|
| 2008/0231731 A1* | 9/2008 | Hull | B33Y 30/00 |
| | | | 348/241 |
| 2016/0151974 A1* | 6/2016 | Costabeber | B29C 64/259 |
| | | | 264/401 |
| 2017/0326803 A1* | 11/2017 | Chanclon | B29C 64/357 |
| 2018/0178452 A1* | 6/2018 | Costabeber | B29C 64/259 |
| 2018/0370136 A1* | 12/2018 | Stadlmann | B29C 64/259 |
| 2019/0184641 A1* | 6/2019 | Swier | B29C 64/357 |
| 2021/0170673 A1* | 6/2021 | Lorunser | B29C 64/124 |

\* cited by examiner

STEREOLITHOGRAPHY APPARATUS MATERIAL PROVISION DEVICE

CROSS-REFERENCE TO RELATED APPLICATIONS

This application claims priority to European patent application No. 18162320.8 filed on Mar. 16, 2018, the disclosure of which is incorporated herein by reference in its entirety.

FIELD OF THE INVENTION

The invention relates to a material provision device and to a stereolithography apparatus.

BACKGROUND

Rapid prototyping processes are used increasingly to produce components quickly and with high precision based on CAD/CAM data.

The stereolithography process which is particularly used in the field of dental technology and which may be used further stands out from known processes. In a way known per se, the respective component is built up in layers from a liquid, the print material, by exposing certain structures.

Here, the layer thickness is between 0.05 and 0.25 mm, which imposes correspondingly high requirements on the drive of the construction platform and on the provision of the print material bath, respectively.

On the other hand, different structures are required to produce different components. With respect to the choice of colors alone, it is favorable to have different print materials ready.

Thus, it has already been suggested to work with movable troughs which each receive a print material in the desired color, respectively, and to move the desired trough with the correspondingly desired color of the print material into the active region, that is to say into the region in which the component is produced.

As the used print materials are typically sensitive to light, the troughs have been provided with a suitable lid or any other cover to prevent early drying out of the print material.

However, this solution is not satisfying as the handling of the troughs frequently leads to or at least may lead to losses of print material and also to contamination of the surroundings, wherein confusion is not excluded either.

A further stereolithography process is known from WO 2010/45951 A1 and corresponding U.S. Pat. Nos. 8,741,203 and 9,796,138 patents, which are hereby incorporated by reference, in which a trough and a cartridge are used among others. The low flexibility of the process is disadvantageous in particular when changing the print material.

SUMMARY

In contrast, the invention is based on the task of providing a material provision device in accordance with the claims and a stereolithography apparatus in accordance with the claims, respectively, which allows for universal use of the respective stereolithography apparatus and which is also easy to operate.

This task is inventively solved by the claims and advantageous developments may be taken from the subclaims.

According to the invention, a material provision device with a material cartridge is provided which is closed on all sides. The closed configuration provides for a light-proof material provision device independent of whether the cartridge is arranged in the material provision device or not.

In this respect, the material provision device comprises a mounting frame which is openable and closable in particular in a light-proof fashion. The inventive material cartridge which is particularly bottle-shaped may be inserted in this mounting frame. This cartridge in turn receives the print material and is configured such that the print material may be output for the rapid prototyping device, in particular the stereolithography apparatus.

According to the invention, the material provision device comprises a special material cartridge with an outlet valve unit. Print material is output from the cartridge via the outlet valve unit if necessary. It depends on the relative position of the material provision device to the stereolithography apparatus as for the rest if material can be output or not.

In an advantageous configuration, the valve is open if the material cartridge is positioned above the outlet valve unit and closed if it is positioned next to the valve unit.

The material cartridge is configured preferably as a bottle. The outlet valve unit may be mounted to its connection, for instance with a screw connection.

When the material cartridge is swiveled into the vertical position in which its outlet extends towards the bottom, the valve is opened by means of this movement of the part of the valve unit connected to the material cartridge.

In this position, there is a flow connection from the material cartridge until the outlet of the outlet valve unit in this respect. It ends in the trough for receiving the print material such that material may flow from the bottle into the trough.

When the material cartridge is swiveled laterally to the bottom such that it extends substantially horizontally, the part of the valve unit connected with the outlet of the bottle is hereby swiveled at the same time. This movement closes the valve.

In an advantageous configuration, it is provided that the outlet valve unit may be removed in that position from the mounting frame of the material provision device. For this purpose, a slide guide is provided which enables removal of the respective part of the valve unit to the top.

In this position, the bottle together with the valve unit may be replaced by a new bottle. For this purpose, either a new outlet valve unit may be screwed onto the new bottle or the one used up to now is screwed off and screwed onto the new bottle.

According to the invention, it is favorable if a joint is provided which is integrated in the outlet valve unit and which divides it into two parts which are connected with one another by the joint so as to be pivotable.

A first joint part preferably comprises a connection for the material cartridge. It is configured as a bottle, it comprises a bottleneck or bottle outlet. It may have an external thread, and the first joint part may then be screwed thereon.

It is to be understood that instead of the screw connection any other connection may be realized thereat, for instance a bayonet joint.

The other joint part is preferably configured to ensure connection with the rest of the material provision device.

Preferably, the second joint part comprises a slide guide for this purpose, for instance a laterally protruding spring, which may be slid into a respective groove at the mounting frame of the material provision device.

The inventive joint allows swiveling of the material cartridge by 90 degrees relative to the mounting frame. In the upright position, the material cartridge is supported headfirst and the valve is open.

In the lying position, the material cartridge extends at the side of the joint and the outlet valve unit and the valve is closed.

In the lying position of the material cartridge, the above-mentioned slide guide is accessible such that the material cartridge may be removed together with the outlet valve unit and a new material cartridge with the outlet valve unit may be inserted.

In contrast, in the upright position of the material cartridge, the slide guide is blocked such that in case of an open valve the material cartridge may not be pulled out accidentally which would lead to contamination of the stereolithography apparatus.

The second joint part extends to the bottom in the manner of a pipe. This pipe presents the outlet of the outlet valve unit and ends in the trough.

When the rapid prototyping device is realized as a stereolithography apparatus, a trough is provided as is above mentioned, into which the print material may be output from the material cartridge. For this purpose, the material cartridge comprises the outlet valve unit with a valve according to the invention. It is designed such that print material output thereat is output directly into the trough.

The outlet of the outlet valve unit is preferably configured to be so long that it ends at the desired liquid level of the print material in the trough.

The liquid level of the print material in the trough is self-leveling, as is known from watering troughs, for instance: As soon as the liquid level falls below the lower end of the outlet, air may enter into the material cartridge through the outlet and the outlet valve unit such that print material may follow.

Instead, any other self-regulating device may keep the liquid level in the trough constant. For instance, a float valve known per se may be mentioned wherein the above-mentioned watering trough regulation is preferred compared with this, as the risk of cross-contamination is lower.

In an advantageous configuration, it is possible to draw the print material back into the material cartridge if necessary. By gravity and/or hydrostatic effects, print material flows out of the material cartridge such that the trough is always filled sufficiently.

It is particularly favorable that a one-to-one alignment of the material cartridge and the trough is realized according to the invention. This may be ensured for instance by a respective coding such as a mechanical coding. Then, the combination of trough and material cartridge has the same print material provided that the coding is made specific to the material.

Here, specific to the material means both the type of the used print material, that is to say the chemical composition, and also other properties of the print material such as the color of the print material.

In an advantageous configuration, the spatial alignment between the material cartridge and the trough is realized such that there is a fluid connection between the material cartridge and the trough independent of the state of the trough.

The desired liquid level of the print material in the trough is ensured independent of the state that is also during construction of the molding to be produced as the outlet of the outlet valve unit protrudes into the trough and levels its liquid level.

For this purpose, it is favorable that the outlet ends exactly horizontally and that the stereolithography apparatus is positioned exactly horizontally.

To realize a stereolithography apparatus, it is required to provide an exact height of reference during layer construction. According to the invention, a transparent support window serves this purpose which may be configured as a glass plate whose upper side is used as a height of reference. The glass plate serves as a basis for a film which is provided at the bottom of the trough. The film is spanned across the glass plate such that there is always an exact height of reference independent of inaccuracies of guidance at the trough.

In this respect, in practical use the material provision device including the material cartridge and the trough is initially inserted into the stereolithography apparatus.

According to an alternative configuration, it may also be provided for this purpose that the glass plate is set to a desired and predefined height which is the height of reference.

At this point in time, that is to say when the glass plate is in contact with the film, the trough is filled but only if this is necessary, that is to say when the trough has not been filled already before. This may be realized, for instance, by opening the valve.

In another embodiment, the level may be regulated based on the output signal of a sensor which detects the height of the level.

According to the invention, it is favorable if the alignment between material cartridge and trough is maintained when material is changed. The correct coding ensures this. The material provision device may be removed from the stereolithography apparatus and taken to a storage site. When the material cartridge is empty, it may only be replaced by a material cartridge comprising exactly the same material. This is ensured by the coding as then a material cartridge with another print material is not insertable due to the mechanically operated coding for the alignment between the material cartridges and the trough.

Basically, the trough may also be replaceable, but again only because of its coding, only when its coding fits the coding of the material cartridge. The other part of the material provision device, that is to say the mounting frame, is basically reusable and is a reusable part as such. This holds true for all parts of the material provision device except for the material cartridge. It is configured as a disposable part. However, the material consumption for the material cartridge itself is very limited especially as it may be configured as a simple bottle.

The trough in itself is a reusable part. However, the service life of the bottom film is limited such that it should be replaced after 5000 or 10000 removal steps for instance, that is to say after a corresponding number of construction steps.

The material provision device with the inserted material cartridge is completely closed and sealed. As long as the trough is not filled and the valve is in the closed position, it may be stored in any desired way, also upside down. A mechanical lock ensures that the material cartridge with the outlet valve unit may be removed only if the material cartridge is in the horizontal swiveling position, that is to say in the state in which it has been received in the material provision device.

Preferably, the outlet protrudes into the trough.

In an advantageous configuration, it is provided that a transparent support window, in particular a glass plate, is arranged below the trough and that a film of the trough may be spanned thereacross. The upper side of the glass plate plus the thickness of the film will then give the height of reference during construction or slicing within the scope of the stereo lithography process.

In a further configuration of the trough, it is provided that it is equipped with a screen at one corner. It is also possible to provide several screens at every corner of the trough, respectively. Excess print material which has remained in the trough may be poured out through the screen and filtered at the same time such that impurities are withheld and the remaining print material may be recycled in this respect.

Then, the print material is preferably output into a trough which comprises the same coding, that is to say which is intended for the same print material. Here, the screen may be either connected fixedly with the trough or handled separately therefrom. The mesh size of the screen may be adapted to the requirements largely, preferably the mesh size amounts to less than 500 μm, preferably to approximately 150 μm.

According to the invention, it is favorable that the material provision device may be opened from the top. Then, the material cartridge is exposed and may be replaced. For this purpose, the material cartridge together with the outlet valve unit is pulled out from its slide guide without further ado and the outlet valve unit is screwed onto the new material cartridge. Closing of the material provision device is only possible in the lying state of the material cartridge due to the mechanical lock.

The trough may also be replaced if necessary, wherein a snap connection is provided for this purpose, for instance, which needs to be overcome to replace the trough.

Instead of the preferred simple valve, it is possible to realize several valves and corresponding valve seats, if necessary.

BRIEF DESCRIPTION OF THE DRAWINGS

Further advantages, details and features may be taken from the following description of several exemplary embodiments of the invention in conjunction with the drawings.

DETAILED DESCRIPTION

Figure 1:
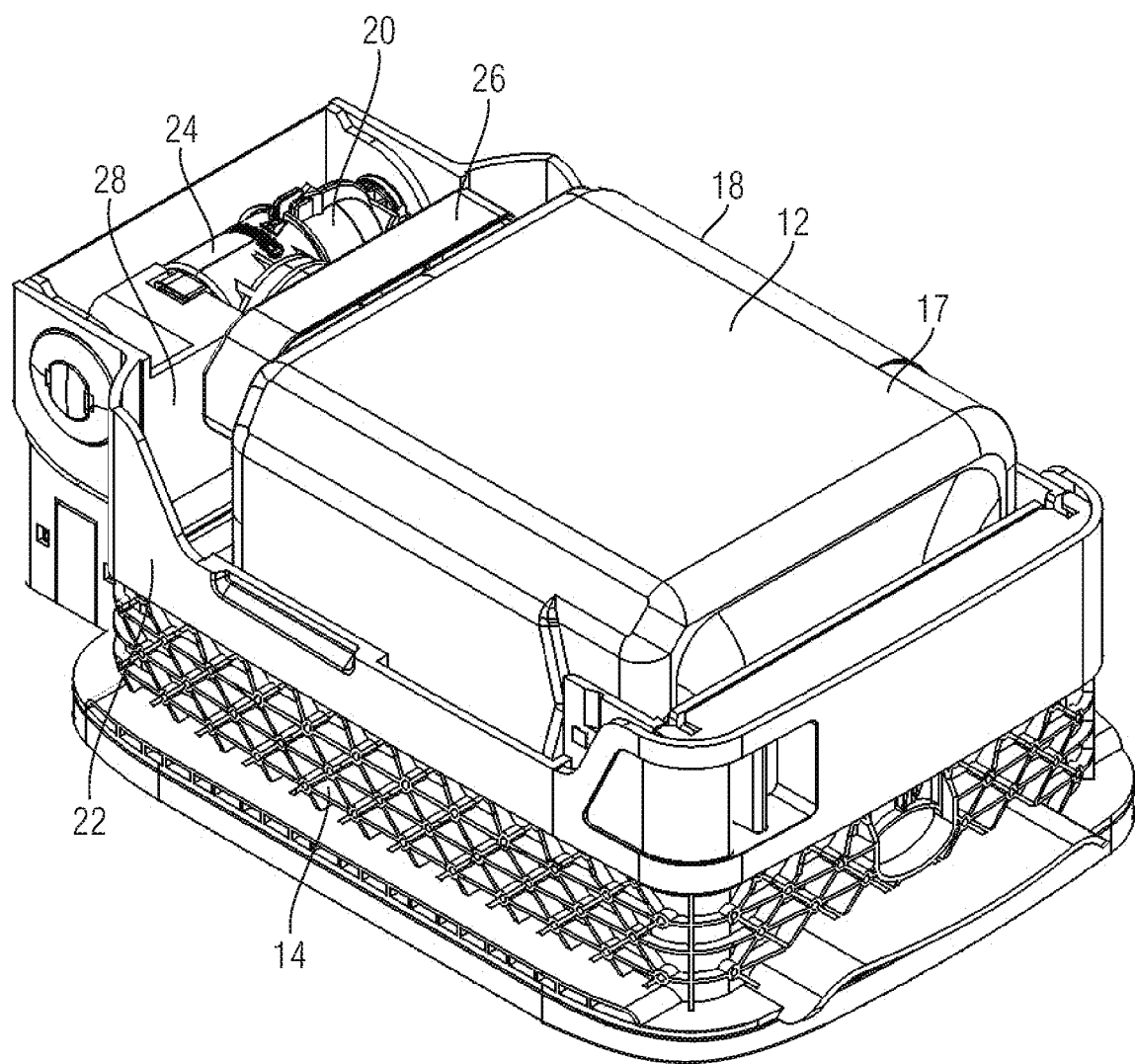
FIG. 1 shows a schematic perspective illustration of a part of an inventive material provision device in one embodiment, namely the material cartridge, the mounting frame and the trough, in one embodiment of the invention.
Figure 8:
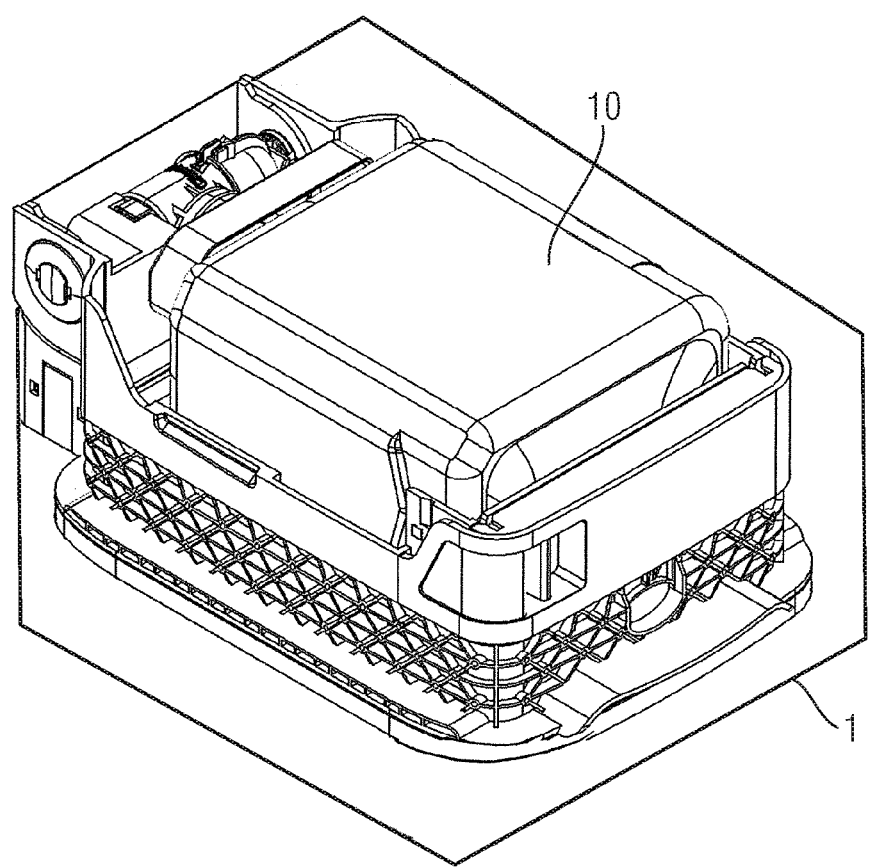
FIG. 8 shows the inventive material provision device in a stereolithography apparatus.

A schematic perspective illustration of an inventive material provision device 10 as part of a stereolithography apparatus 1 is apparent from FIGS. 1 and 8.

The material provision device 10 comprises a material cartridge 12 and a trough 14 below. In a way known per se, the trough 14 is intended to receive print material and comprises a transparent bottom on which a film rests which is also transparent.

As is usual with a stereolithography apparatus, the print material is exposed from the bottom layer by layer.

The so-called construction platform which is not illustrated herein is lifted gradually, for instance with a resolution of 0.05 mm, to give the object to be produced the desired shape. The material cartridge comprises a bottle 17 which is substantially rectangular having rounded corners 18.

Its dimensions are chosen such that it fits into a mounting frame 22 horizontally which adjoins the trough 14 above it and comprises substantially the same flat-rectangular cuboid shape, also with rounded corners.

Further, the material cartridge 12 comprises a receiving valve unit 20.

The receiving valve unit 20 comprises a joint 24 around which it may be swiveled between a swiveling part 26 and a fixed part 28. The swiveling part 26 is connected with the bottle 17, namely in a sealed manner.

In contrast, the fixed part 28 is plugged into the mounting frame 22 such that no impurities may arise due to print material or enter areas in which they are undesired.

Figure 2:
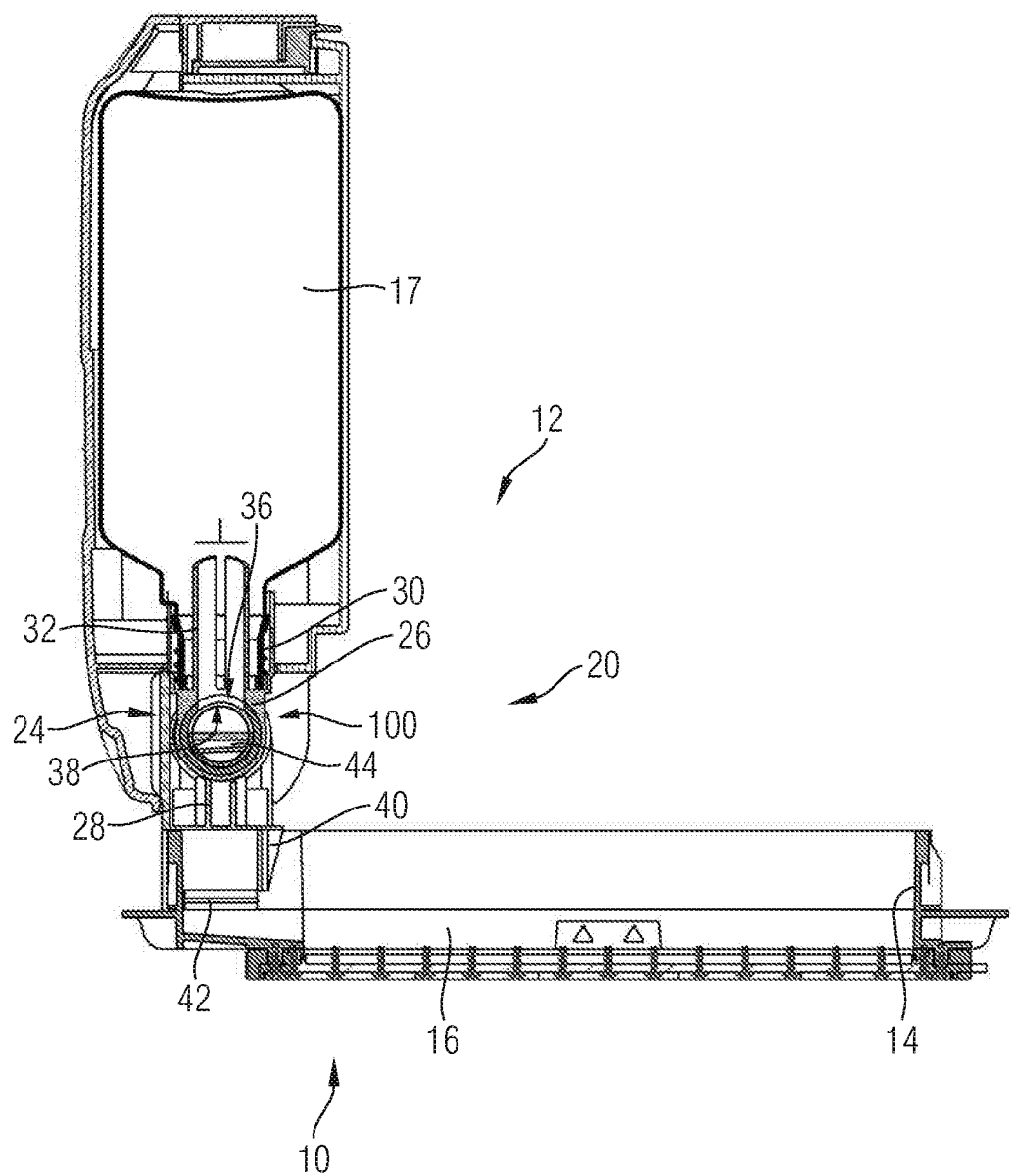
FIG. 2 shows the embodiment according to FIG. 1, in a sectional view and in another position of the material cartridge.

A further embodiment of the inventive material provision device 10 is apparent from FIG. 2. The embodiment according to FIG. 2 differs only in details from that according to FIG. 1. As is apparent from FIG. 2, the material cartridge 12 comprises a valve 100 besides the bottle 17 and the receiving valve unit 20, said valve being open in the illustrated position of the material cartridge 12.

The bottle 17 comprises a screw connection 30 which is screwed into the swiveling part 26 of the receiving valve unit 20 and which seals at a sealing surface 32.

As is apparent from FIG. 2, the swiveling part 26 partially encompasses the fixed part 28. Both parts comprise an opening 36 and 38 each. When these openings are aligned with one another, as is apparent from FIG. 2, the valve 100 is open and print material may flow out of the bottle 17.

The fixed part 28 comprises a specially shaped outlet 40. Said outlet ends towards the bottom with a ring-shaped surface 42 pointing towards the bottom and extending horizontally accordingly.

The outlet 40 and the ring-shaped surface 42 protrude into the trough 14.

The print material 16 flowing out of the bottle 17 by gravity may only stream out to the extent that air can flow in. Self-leveling takes place by the planar ring-shaped surface 42. Only after the liquid level in the trough 14 has fallen, air enters the outlet 40 through the ring-shaped surface 42 and may rise into the bottle 17 in this way.

As long as the liquid level of the print material is as high as the ring-shaped surface 42 or higher, it seals against the ring-shaped surface 42 such that no air may enter the bottle 17 and thus no print material may stream out of the bottle 17.

This principle may also be referred to as watering trough principle.

A guide element 44 is also illustrated in FIG. 2. The guide element 44 is connected with the swiveling part 26 and is horizontal in the upright position of the bottle 17.

The mounting frame 22 comprises a slide guide not illustrated herein which extends laterally, that is to say in front of the drawing plane in the illustration according to FIG. 2, and receives the guide element 44. The slide guide allows for swiveling of the guide element 44 in a bottom region, but is smaller at the top.

Accordingly, the guide element 44 cannot pass through the slide guide in the position according to FIG. 2 such that removal of the material cartridge 16 is blocked in its upright position.

Figure 3:
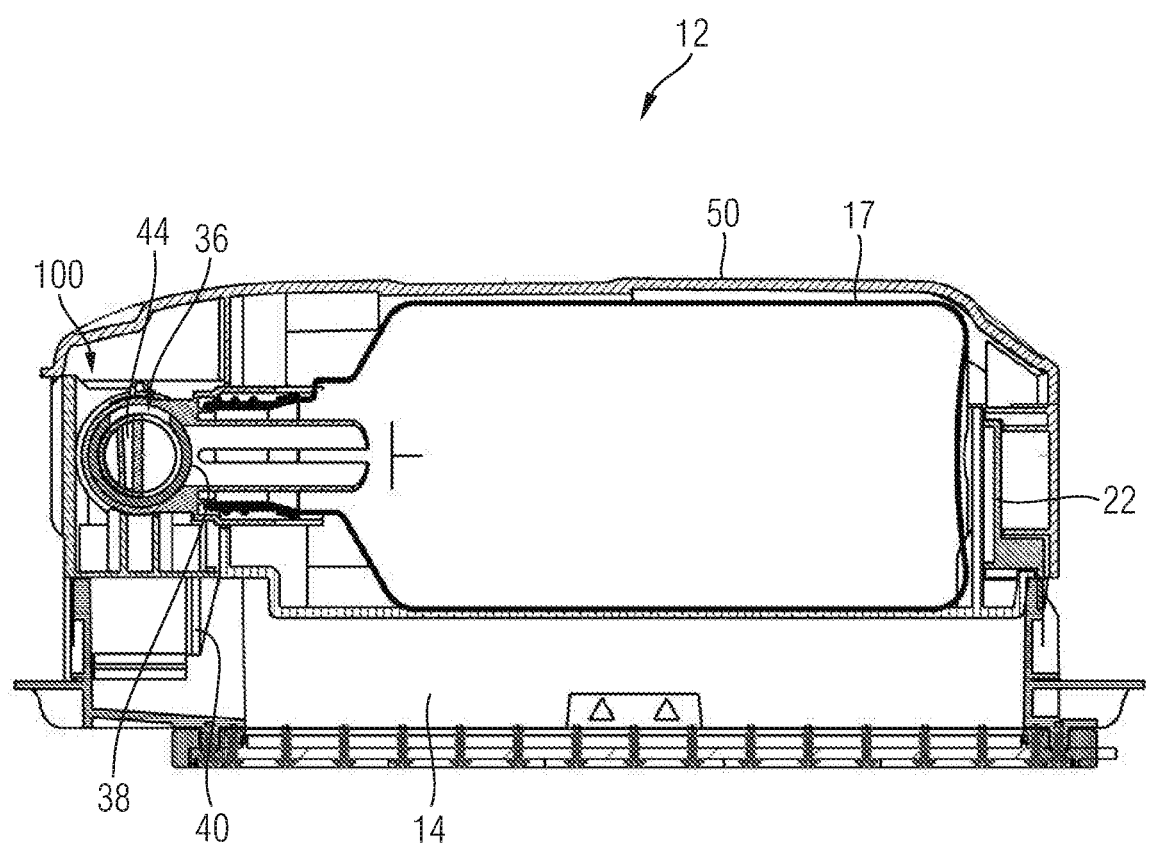
FIG. 3 shows a sectional illustration according to FIG. 2, however in the lying position of the material cartridge.

As is apparent from FIG. 3, the material cartridge 12 may be swiveled around the joint 28, from the upright position according to FIG. 2 into the lying position according to FIG. 3. In this position, the guide element 44 extends vertically and fits through the guide rail such that removal of the material cartridge 12 is possible.

Accordingly, the bottle 17 may be removed in the position according to FIG. 3 and may be replaced by a new bottle 17 after unlocking the screw connection at the screw connector 30.

In the position according to FIG. 3 the opening 36 is additionally offset relative to the opening 38. Consequently, the valve 100 is closed in the position according to FIG. 3 such that the print material received in the bottle 17 may not stream out of the outlet 40.

As is apparent from FIG. 3, the mounting frame 22 comprises a cover 50. The cover 50 accommodates the bottle 17 in a light-proof manner and may be removed if necessary to enable change of bottles.

It is additionally apparent from FIG. 3 that the mounting frame 22 completely covers the trough 14 at the top. Thus, any print material located thereat is protected against the entry of light already by the mounting frame 22.

Figure 4:
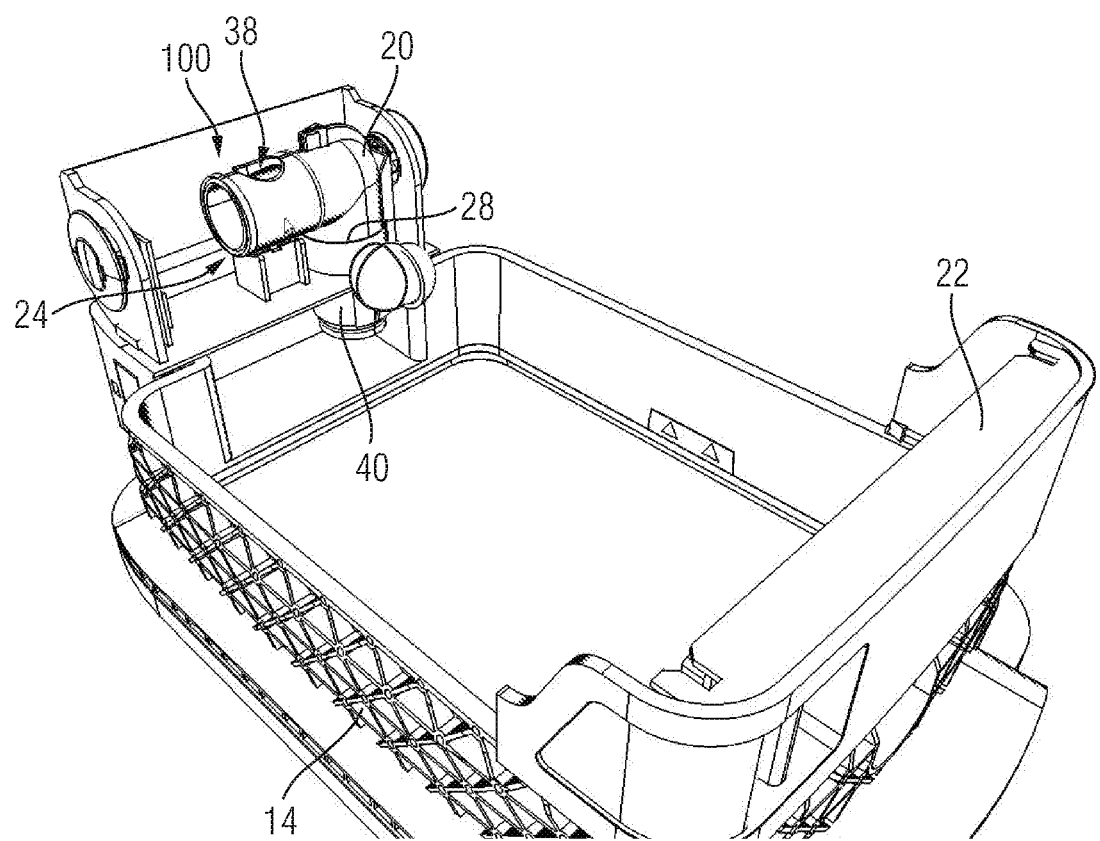
FIG. 4 shows a perspective illustration according to FIG. 1, wherein the material cartridge is removed.

A perspective illustration of the mounting frame 22 in parts and of the trough 14 is apparent from FIG. 4. Of the material cartridge 12 only a part of the outlet valve unit 20 is apparent, namely the valve 100 with the opening 38 and the fixed part 28.

As is apparent, the outlet 40 extends to the side of and below the joint 24.

Figure 5:
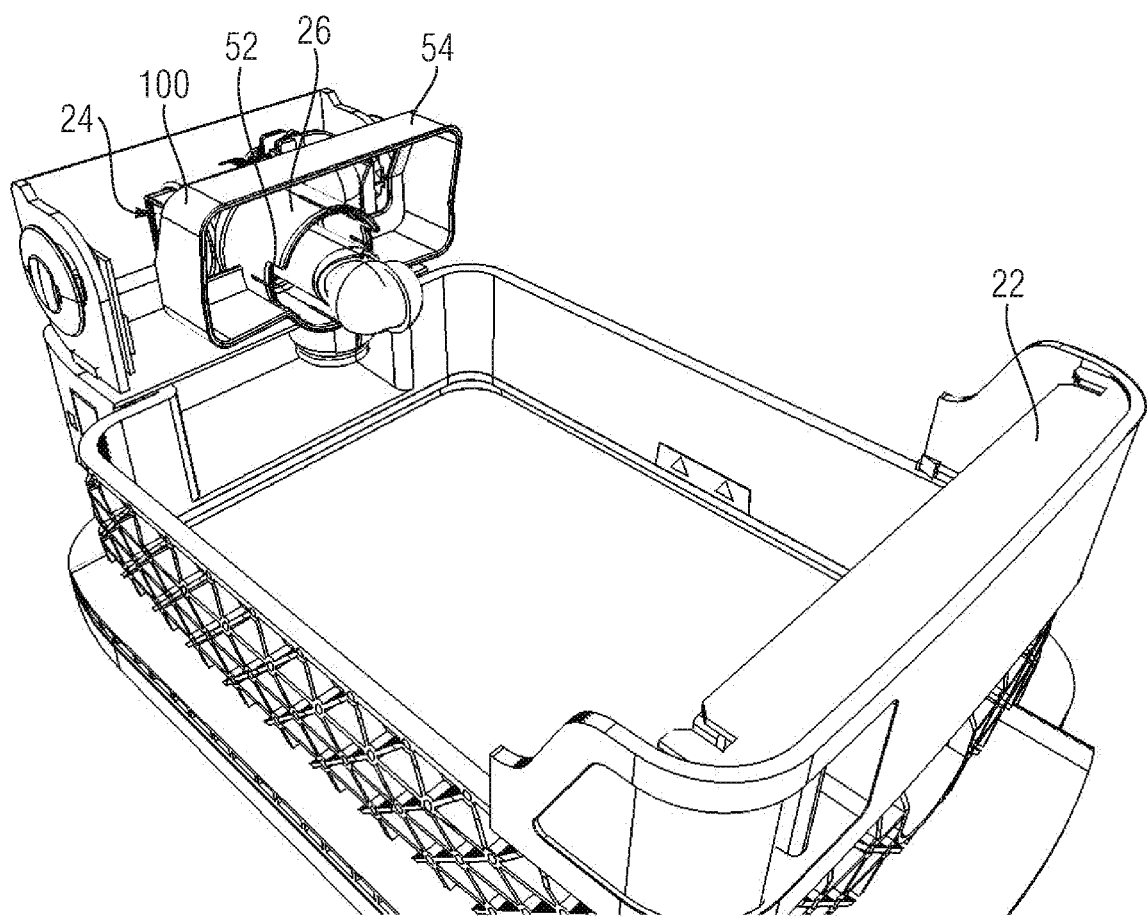
FIG. 5 shows the embodiment according to FIG. 4, wherein a part of the material cartridge is apparent.

As is apparent from FIG. 5, the swiveling part 26 encompasses the fixed part 28 at the joint 24.

As is also apparent from FIG. 5, the swiveling part 26 comprises an internal thread 52 which fits the screw connector 30 of the bottle 17 not illustrated in FIG. 5.

The swiveling part 26 also comprises a support frame 54 which serves an improved lateral and vertical support of the bottle 17.

Figure 6:
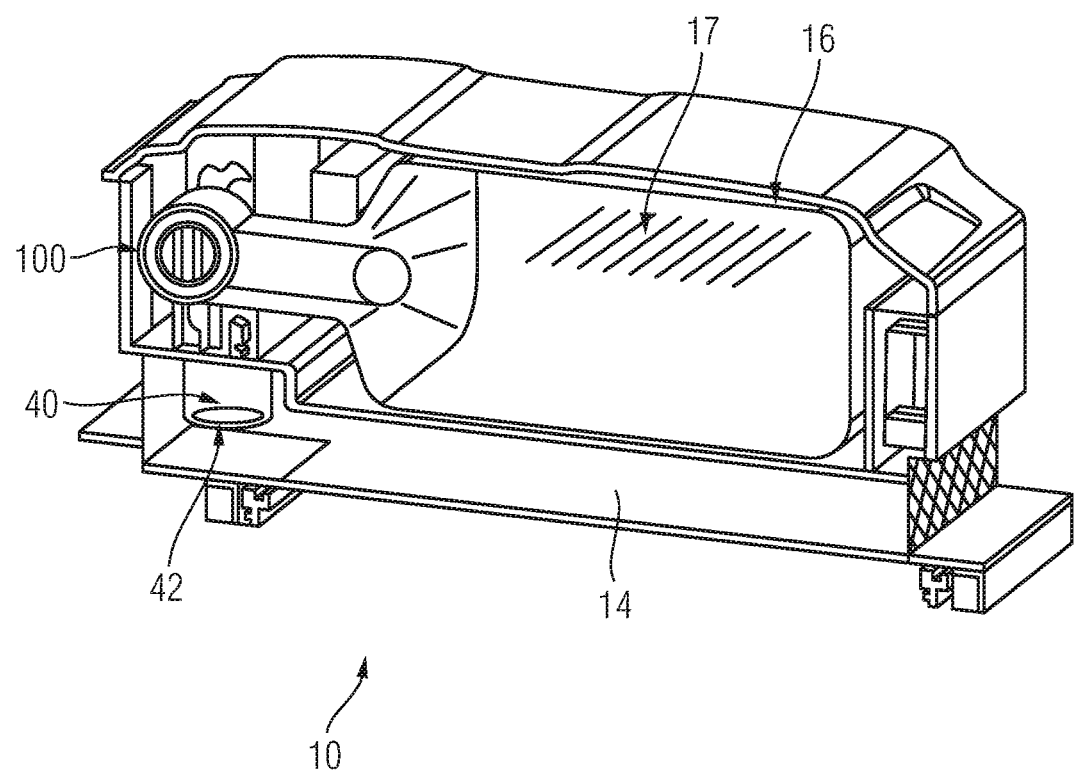
FIG. 6 shows a schematic perspective sectional view through a further embodiment of an inventive material provision device.

FIG. 6 shows a further embodiment of the inventive material provision device 10. Here, as in the further figures, the same reference signs refer to the same or similar parts.

It is apparent that the outlet 40 protrudes to the bottom into the trough 14 and that its planar surface 52 ends approximately at half the height of the trough 14.

According to FIG. 6, the bottle 17 is arranged in the lying position. The valve 100 is closed in this position.

The print material 16 in the bottle 17 illustrated schematically in FIG. 6 cannot stream out of the bottle. The bottle may be replaced in this position.

Figure 7:
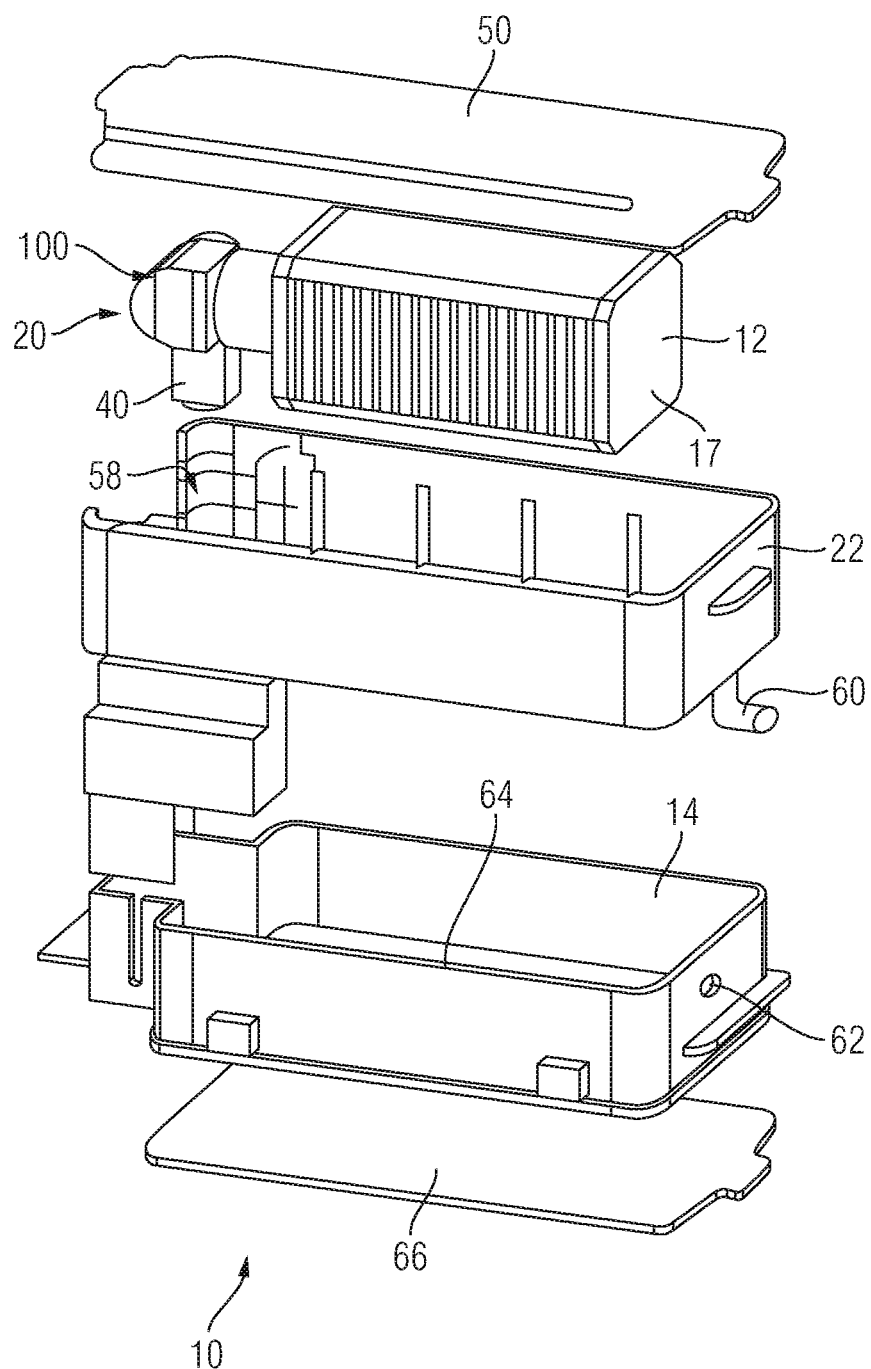
FIG. 7 shows the inventive material provision device in another embodiment, in an exploded view.

It is apparent from FIG. 7 how the individual parts of the material provision device 10 are assigned to one another in this embodiment.

The cover 50 is a type of lid in this embodiment which closes off the top of the mounting frame 22 flatly. The mounting frame 22 receives the material cartridge 12 which consists of the bottle 17 and the outlet valve unit 20. The valve 100 in the outlet valve unit 20 is closed. The outlet 40 of the outlet valve unit 20 protrudes to the bottom. It may be slid into a slide guide 58, which is apparent only schematically, in the mounting frame 22.

The mounting frame 22 fits onto the trough 14 and may be locked thereat. For this purpose, a snap-in pin 60 is provided which engages with a snap-in recess 62 when the mounting frame 20 is put on the trough 14.

The trough 14 is provided with a transparent film 64 at the bottom which rests on a glass plate 66 in use.

The invention claimed is:

1. A stereolithography apparatus material provision device (10) for print material (16) to be cured comprising
    a material cartridge (12) which is configured to receive the print material (16), and surrounds the print material (16) on all sides,
    an outlet valve unit (20) received at least partially in the material provision device and at least partially supported by the material provision device (10) and connected to the material cartridge (12) to provide a liquid-proof seal via which the print material (16) is output, wherein the print material (16) flows from the material cartridge (12) by gravity and self-leveling takes place by a planar surface (42) of the material cartridge (12), and
    wherein the outlet valve unit (20) comprises a valve (100) which is configured to be opened and closed depending on a relative position of the material provision device (10) and the stereolithography apparatus.
2. The material provision device as claimed in claim 1, wherein the print material comprises a photopolymer.
3. The material provision device as claimed in claim 1, wherein the material cartridge is swiveled between a horizontal position and a vertical position.
4. The material provision device as claimed in claim 1, wherein the valve (100) is open when the material cartridge is in a vertical position and closed when the material cartridge (12) is in a horizontal position.
5. The material provision device as claimed in claim 1, wherein the valve (100) comprises a joint having a swiveling angle of at least 70 degrees or at least 90 degrees.
6. The material provision device as claimed in claim 1, wherein the outlet valve unit (20) is screwed to the material cartridge (12) by a screwcap or a cap that is pluggable to and sealable against the material cartridge.
7. The material provision device as claimed in claim 1, wherein the material cartridge (12) is configured as a light-proof bottle (17) with a cross-section in a shape of a rectangle with rounded corners (18) which is closable using a screw-on closure cap.
8. The material provision device as claimed in claim 7, wherein the closure cap on the material provision device (10) is removable and replaceable with the outlet valve unit (20).
9. The material provision device as claimed in claim 1, wherein the outlet valve unit (20) comprises a joint (24) with swiveling motion that opens and closes the valve (100).
10. The material provision device as claimed in claim 1, wherein a joint (24) of the outlet valve unit (20) connects a swiveling part (26), which is configured to be connected with the cartridge (12), and a fixed part (28), which is configured to be plugged into a mounting frame (22), with one another so as to be pivotable.
11. The material provision device as claimed in claim 1, wherein the outlet valve unit (20) protrudes into a trough (14) containing liquid print material (16) and an end of the outlet valve unit (20) ends at a desired liquid level such that self-leveling of the print material is provided in the material cartridge.

12. The material provision device as claimed in claim 1, wherein the material cartridge (12) together with the outlet valve unit (20) is pluggable into a recess in a frame (22) of the material provision device (10) and removable therefrom in the closed position of the valve (100).

13. The material provision device as claimed in claim 1, wherein insertion and removal of the material cartridge (12) together with the outlet valve unit (20) into and out of a frame (22) of the material provision device (10) is blocked in the open position of the valve (100).

14. The material provision device as claimed in claim 4, wherein the material provision device (10) is closed by a lid (50) and is at least partially light-proof, wherein the lid (50) is closed and opened to exchange the cartridge (12).

15. The material provision device as claimed in claim 11, wherein the material cartridge (12) and/or the trough (14) is configured as a disposable part and a mounting frame of the material provision device (10) is configured as a reusable part, wherein all parts are light-proof.

16. The material provision device as claimed in claim 1, wherein one or more troughs (14) are provided, wherein a coding at the one or more troughs (14) fits a coding at the material cartridge (12) and wherein the codings different from one another do not fit one another.

17. A stereolithography apparatus comprising a material provision device for receiving a material cartridge (12) which in turn receives print material (16) and surrounds the print material on all sides, wherein the material cartridge (12) is configured to be connected to an outlet valve unit (20) to provide a liquid-proof seal via which the print material (16) is output and which is received at least partially in the material provision device (10) and which is supported at least partially by the material provision device (10), and wherein the outlet valve unit (20) comprises a valve (100) which is opened and closed depending on a relative position of the material provision device (10) and the stereolithography apparatus, wherein the print material (16) flows from the material cartridge (12) by gravity and self-leveling takes place by a planar surface (42) of the material cartridge (12).

* * * * *